United States Patent Office 3,257,477
Patented June 21, 1966

3,257,477
PROCESS FOR FLEXIBLE POLYESTER-ETHER
COMPOSITIONS
Ross Melvin Hedrick, Dayton, Ohio, assignor to Monsanto Company, a corporation of Delaware
No Drawing. Filed June 13, 1961, Ser. No. 116,672
10 Claims. (Cl. 260—872)

This invention relates to new flexible polyester-ether compositions prepared by the reaction of a plurality of certain monoepoxy containing compounds with ethylenically-unsaturated dicarboxylic acid anhydride compounds under substantially anhydrous conditions in the presence of certain cationic catalysts. More specifically this invention relates to the new flexible polyester-ether compositions prepared by the reaction of propylene oxide and/or butylene oxides with a cyclic unsaturated acid anhydride compound, e.g., maleic anhydride, wherein the total moles of the cyclic anhydride compound is less than that of the monoepoxide compound, in the presence of an effective amount of the cationic catalysts from the group consisting of antimony pentachloride, stannic chloride, zinc chloride, titanium tetrachloride or stannous chloride or antimony trifluoride or antimony trichloride, wherein each of the latter three compounds are employed with at least about a stoichiometric amount of iodine.

Polyesters in general are well-known in the prior art. Thus alkyd resins prepared by the polyesterification condensation reactions of polyhydric compounds with polycarboxylic acids, e.g., one or more alcohols such as ethylene glycol, propylene glycol, diethylene glycol, glycerol, pentaerythritol, sorbitol and the like have been condensed at relatively high reaction temperatures of the order of about 200° to 260° C. over a relatively long period of time with one or more acids such as phthalic acid, maleic acid, fumaric acid, succinic acid, adipic acid, sebacic acid and the like with the evolution of water, until the desired viscosity and acid number are attained. Often it was desirable to modify the polyester composition by including a drying oil fatty acid in the reaction mixture such that with the addition of various siccative agents the composition could be spread in a thin film and dried to a hard, tough protective coating. Similar compositions can be more directly prepared by the ester-interchange reaction of a vegetable oil and glycerol in the presence of small amounts of alkaline catalysts. More recently various difunctional acids or esters and alcohols have been condensed to provide a high molecular weight linear polymer which is suitable in forming fibers, e.g., terephthalic acid and esters thereof condensed with various polymethylene glycols containing from 2 to 10 carbon atoms therein (U.S. Patent No. 2,465,319). Additionally it is known to effect the reaction of alkylene oxides with anhydrides of polybasic acids to effect the production of polyesters without the formation of water (British Patent No. 500,300). It is disclosed that the said reaction is carried out a temperatures of between 100° to 250° C. and that the reaction can be accelerated by the presence of a mineral acid, such as phosphoric acid, or a base, such as sodamide. Subsequently it has been found that alkylene oxides can be reacted with anhydrides of polybasic acids in the presence of a strong base catalyst and preferably containing at least 10 weight percent of water based on the amount of basic catalyst employed (U.S. Patent No. 2,822,350).

It is the primary object of the instant invention to provide a new method of preparing flexible polyester-ether compositions. Another object of the instant invention is to provide new flexible polyester-ether compositions. Still another object of the instant invention is to provide new flexible polyester-ether compositions containing blocks of polyalkylene ethers therein preferably prepared by the polymerization of an average of at least four units of an alkylene oxide, containing at least 3 carbon atoms therein, between the polyester units per se. A further object of this invention is to provide elastomeric polyester-ether compositions which are useful in the electrical industry for potting compositions, insulation coating on electrical cables and wires, and the like. Other objects and advantages of the instant invention will be apparent to those skilled in the art from the following disclosure.

It has now been found that high molecular weight polyester-ether compositions can be prepared by the reaction of alkylene oxides, containing at least 3 carbon atoms, with an ethylenically-unsaturated dicarboxylic acid anhydride compound in the presence of a cationic catalyst selected from the group consisting of antimony pentachloride, stannic chloride, zinc chloride, titanium tetrachloride, or a combination of stannous chloride or antimony trifluoride or antimony trichloride together with at least a stoichiometric amount of iodine. The cationic catalyst can be employed in an amount of from about 0.1 to about 5 mol percent, preferably from about 0.2 to about 3 mol percent, based on the amount of anhydride employed in the reaction. After the polyester-ether composition is reacted and the resinous composition preferably reduced to an acid number of less than about 5, an amount, usually from about 20 to about 75 weight percent and preferably from about 30 to about 50 weight percent, of a vinyl monomer sufficient to effect a cross-linking action between the ethylene groups of the linear polyester-ether chains is employed to convert the polyester-ether resin to an insoluble, infusible compostion. The cross-linking operation is carried out in the presence of a vinyl polymerization catalyst such as the various peroxides, e.g. benzoyl peroxide, lauroyl peroxide, acetyl peroxide, succinyl peroxide, tert.-butyl hydrogen peroxide, t-butyl perbenzoate, methyl ethyl ketone peroxide, cumene hydroperoxide, di-t-butyl peroxide, dicumyl peroxide, 2,4-dichlorobenzoyl peroxide, and the like. Additionally, curing the resin can be accelerated by the application of heat to the system. Since vinyl monomers tend to polymerize in the presence of radiant energy, heat, and certain metal compounds, it is desirable to add an inhibitor to the system, e.g., hydroquinone, tert-butyl catechol, pyrogallol benzoquinone, and the like, such that the polyester-ether composition containing the vinyl monomer will be stable until the composition is ready for curing. Suitable vinyl monomers are styrene, dichlorostyrene, α-methyl styrene, vinyl acetate, acrylonitrile, vinyl pyridine, methyl methacrylate, diallyl phthalate, diallyl adipate, vinyl toluene, divinylbenzene, and the like, all of which monomers have the common structural unit $CH_2=C<$. The vinyl monomer can also be employed with a comonomer, e.g., styrene with 2-ethylhexyl fumarate and other alkyl ester fumarates, preferably containing up to about 12 carbon atoms. Also the comonomer compound, if any, should be present in an amount not greater than 50 mol percent of the comonomer composition and preferably when present should be employed in an amount of not greater than 40 mol percent of the comonomer composition.

Suitable α,β-unsaturated dicarboxylic acid anhydride compounds are maleic anhydride, citraconic anhydride, glutaconic anhydride, muconic anhydride, and the like. Other suitable ethylenically-unsaturated dicarboxylic acid anhydride compounds are itaconic anhydride, 1,2,3,6-tetrahydrophthalic anhydride, 3,6-endomethylene-1,2,3,6-tetrahydrophthalic anhydride, and the like. A portion of the unsaturated dicarboxylic anhydride can be substituted with a saturated dicarboxylic anhydride, or a mixture thereof, e.g., succinic anhydride, glutaric anhydride, adipic anhydride, suberic anhydride, sebacic anhydride, phthalic anhydride, isophthalic anhydride, and the like. In general the aliphatic dicarboxylic anhydrides are preferable over the aromatic dicarboxylic anhydrides as favoring more flexible compositions. Whereas up to two mols of saturated dicarbocylic anhydride can be employed for each mole of unsaturated dicarboxylic anhydride, preferably not more than one mol of the saturated anhydride is employed for every mol of unsaturated anhydride. Also it is desirable to employ anhydrides which are substantially free from the corresponding acids since the presence of the carboxyl group tends to retard the rate of reaction between the anhydrides and the alkylene oxides. Accordingly, any commercial lot of anhydride which is not well protected from atmospheric moisture, or the specification for which anhydride does not provide a reactant substantially free from the corresponding dicarboxylic acid, is preferably dehydrated by any suitable means to assure that the reaction mixture is substantially free from any carboxylic acid groups. In view of the foregoing preferred requirement, it will also be understood that the reactions between the dicarboxylic acid anhydrides and the alkylene oxides are carried out under substantially anhydrous conditions.

Additionally various inert materials can be suspended in the polyester-ether composition prior to curing with the vinyl cross-linking compound, i.e., various filler and extender materials such as finely divided pigments and the like, e.g., clay, talc, titanium dioxide, antimony oxide, glass fibers, and the like can be employed.

The polyester-ether compositions of this invention have been found to be particularly useful in the electrical industry wherein the flexible compositions can be employed as potting compositions to protect delicate mechanisms from mechanical shock and can be employed as insulating coatings on electrical cables and wires and the like.

The following examples are illustrative of the present invention.

*Example 1*

A 500 ml., 4-necked flask equipped with a stirrer, a reflux condenser, and a thermometer was flamed while sweeping the vessel with dry nitrogen, whereby any moisture was removed from the vessel. Then 17.5 g. (0.178 mol) of maleic anhydride, 41.3 g. (0.715 mol) of freshly distilled propylene oxide, and 0.5 g. of zinc chloride, as a single fused chunk, were added to the reaction vessel and the system maintained under a slight pressure of dry nitrogen. The zinc chloride was dissolved after about 8 minutes and the mild exothermic reaction allowed to progress for about one hour. Mild external heat was supplied to the system and the temperature of the reaction mixture was gradually increased to a maximum of about 49° C. over a time period of about 5 hours and the reaction mixture was allowed to cool overnight. Then the reaction vessel was held in an oil bath at 75° C. for 3 hours, after which time the oil bath was removed and 0.2 ml. of acetonitrile added to complex the zinc chloride. Thereafter about 250 ml. of benzene containing 0.01 g. of hydroquinone was added to the system to dissolve the polyester-ether polymer. This mixture was extracted twice with water, the organic phase dried over anhydrous magnesium sulfate and filtered. The benzene was removed from the reaction mixture by heating on a steam bath while the system was held under vacuum. Then 31.6 g. of styrene (1.5 mol/mol of the unsaturated maleic acid diester linking unit in the polyester-ether) was added to 49.8 g. of the polymer product and cured in the presence of benzoyl peroxide catalyst to provide a flexible cross-linked polyester-ether polymer composition.

*Example 2*

A mixture of 98 g. (1 mol) of maleic anhydride, 232 g. (4 mols) of propylene oxide, and 0.20 ml. of stannic chloride were introduced into a reaction vessel. Refluxing commenced in about 10 minutes and the viscosity of the reaction mixture increased very rapidly, whereby it was necessary to cool the exothermic reaction in an ice-bath over a period of about 1 hour to avoid excessive foaming. Then the ice-bath was removed and the exothermic reaction permitted to continue. The maximum reaction temperature was observed to be 83° C. The total reaction time was about 2.5 hours. The acid number of the polyester-ether was found to be about 1.8. Then 0.1 g. of hydroquinone and 2 ml. of acetonitrile were mixed with the polyester-ether resin. Portions of the said resin were then mixed with various amounts and comonomer ratios of styrene and 2-ethylhexyl fumarate, wherein said ratio of comonomers are given in weight percent and shown herein below as a fraction, e.g., 60/40 indicates a comonomer ratio of 60 parts styrene to 40 parts 2-ethylhexyl fumarate. Various cured compositions and the heat distortion temperature thereof are given below.

| Polyester-ether resin (grams) | Ratio, S/2EHF | Amount S/2EHF (grams) | Percent Percent Co-monomers | Heat Distortion Temp. (° C.) |
|---|---|---|---|---|
| 14.1 | 60/40 | 11.5 | 45 | −16 |
| 8.3 | 60/40 | 12.5 | 60 | −5 |
| 7.6 | 60/40 | 22.8 | 75 | −7 |
| 11.6 | 70/30 | 9.5 | 45 | −11 |
| 9.5 | 70/30 | 14.3 | 60 | 2 |
| 11.7 | 80/20 | 9.6 | 45 | −2 |
| 8.4 | 80/20 | 12.6 | 60 | 9 |

*Example 3*

A mixture of 24.5 g. (0.25 mol) of maleic anhydride, 25.0 g. (0.25 mol) of succinic anhydride, 116 g. (2 mols) of propylene oxide, and 0.1 ml. of stannic chloride were introduced and mixed in a closed reaction vessel fitted with a stirrer and reflux condenser. A mild exothermic reaction took place which was accelerated by the application of an external heat source the temperature of which was gradually increased such that the reflux temperature of the reaction mixture gradually increased from 43° C. to 72° C. The reaction mixture was found to have an acid number of 1. A small amount of unreacted propylene oxide, about 6 g., was removed from the reaction mixture, then 39.9 g. of styrene and 0.05 g. of hydroquinone were added to give a stable, clear solution containing 20 percent styrene. When a portion of this composition was polymerized (cross-linked) in the presence of a peroxy vinyl catalyst the flexible polyester product was found to have a heat distortion temperature of −20° C.

When additional styrene was added to portions of the aforesaid composition containing 20 percent styrene to respectively raise the styrene content to 30 and 45 percent, the exothermic maximum temperatures were observed to be 98° C. and 120° C., in time periods of 46 and 39 minutes, and the heat distortion temperatures were −12 and 5° C.

*Example 4*

A mixture of 49 g. (0.5 mol) maleic anhydride, 74 g. (0.5 mol) phthalic anhydride, 232 g. (4 mols) propylene oxide, and 0.20 ml. of stannic chloride were introduced into a reaction vessel. The exothermic reaction gradually increased the temperature of the reaction mixture to about 49° C. over a 2-hour period, wherein reflux was started about 10 minutes after the addition of the cationic catalyst. The reaction mixture was cooled and left in a cold-water bath overnight. In the morning the reaction mixture was gradually heated to 81° C., then allowed to cool. This product had excellent color, water white, and was found to have an acid number of about 1. Two ml. of acetonitrile was introduced to kill the catalyst together with the addition of 0.1 g. of hydroquinone. Then 30.9 g. of styrene was dissolved in the polyester-ether resin to provide a composition containing 30 percent styrene. In curing this composition in the presence of a peroxy catalyst the exothermic maximum temperature was found to be 98° C. which temperature was reached after a time of 38 minutes. The heat distortion temperature was found to be —6° C.

To another portion of the above-described polyester-ether resin a composition containing 60 percent of the comonomers styrene and 2-ethylhexyl fumarate in a weight ratio of 60/40 was prepared and cured and the product found to have a heat distortion temperature of —6° C.

*Example 5*

A mixture of 16.3 g. (0.165 mol) maleic anhydride, 49.3 g. (0.33 mol) phthalic anhydride, 116 g. (2 mols) propylene oxide and 0.1 ml. stannic chloride were introduced into a reaction vessel. The mixture was slowly warmed in an oil bath to a maximum temperature of 95° C. and cooled. The acid number of the polyester-ether resin was found to be about 0.9. A 0.05-g. portion of hydroquinone was added to said resin. Then sufficient styrene was added to a portion of said resin to provide a composition containing 30 percent styrene. This composition was cured with a peroxy catalyst and the exothermic maximum temperature was found to be 96° C., which temperature was reached after a time of 48 minutes. The heat distortion temperature was found to be —4° C.

*Example 6*

A mixture of 19.6 g. (0.2 mol) maleic anhydride, 116 g. (2 mols) propylene oxide, and 0.10 ml. of freshly distilled antimony pentachloride were introduced into a reaction vessel. A mild exothermic reaction commenced which was subsequently supplemented by an external heat source to provide a maximum reaction temperature of 53° C. Then the oil bath was removed and the reaction mixture cooled. The acid number of the polyester-ether resin was found to be about 1. This resin can be cross-linked with various vinyl monomers, such as styrene, in similar fashion to the foregoing examples.

*Example 7*

A mixture of 19.6 g. (0.2 mol) maleic anhydride, 116 g. (2 mols) of propylene oxide, and 0.20 g. of antimony trifluoride were mixed together in a reaction vessel and 0.10 g. of iodine added thereto. The reaction temperature was raised to about 37° C. and after a reaction period of about 30 minutes an additional 0.18 g. of iodine was added thereto. Heating was continued for about 2.5 hours with a maximum temperature of 39° C. The reaction mixture then stood at room temperature a number of days prior to further treatment. The acid number was found to be about 1 and after a small amount of unreacted propylene oxide was removed from the reaction mixture the resinous polyester-ether product was found to contain an average of about 8.5 polypropylene ether units for every maleic acid diester unit. Then 117.5 g. of styrene was added thereto to provide a polyester product containing about 50 percent of styrene. This composition was cured in the presence of a peroxy vinyl catalyst and found to have a heat distortion temperature of —5° C. notwithstanding the relatively large amount of styrene employed to cross-link the polyester-ether composition. Additionally this composition was evaluated as to its electrical properties after three weeks immersion in water and found to have a volume resistivity of $19 \times 10^{10}$ ohms, which was of the order of a 250 percent improvement over the prior art flexible polyester compositions.

*Example 8*

A mixture of 5.0 g. (0.051 mol) of maleic anhydride, 11.0 g. (0.153 mol) of 1,2-butylene oxide and 0.15 g. of fused zinc chloride were mixed together, warmed and allowed to stand at room temperature. The viscosity of the mixture was noted to materially increase during this time. The vessel containing the reaction mixture was then introduced into an oil bath held at 100° C. for a period of 3 hours, then the temperature was raised to 120° C. for 1 hour after which time the reaction mixture was very viscous and was observed to be a clear color. A 7.9-g. portion (1.5 mol/mol of maleic anhydride) of styrene was added to the reaction mixture and about one-third of the mixture was then cured to a flexible resin composition by the addition of 0.25 g. of a 50 percent solution of benzoyl peroxide in tricresyl phosphate.

I claim:
1. The process of preparing a polymeric composition consisting of reacting an alkylene oxide, containing at least three carbon atoms therein, with a dicarboxylic acid anhydride, wherein at least 33 mol percent of the said anhydride is an ethylenically-unsaturated dicarboxylic acid anhydride, in a mol ratio of at least 3:1 under substantially anhydrous conditions and in the presence of from about 0.1 to about 5 mol percent, based on the anhydride employed in the reaction, of a cationic polymerization catalyst selected from a member of the group consisting of antimony pentachloride, stannic chloride, zinc chloride, titanium tetrachloride and combinations of stannus chloride, antimony trifluoride, and antimony trichloride, each together with at least about a stoichiometric amount of iodine, and subsequently cross-linking the polyester-ether composition with from about 20 to about 75 weight percent, based on the weight of the total composition, of an ethylenically unsaturated polymerizable compound, characterized by the presence of a terminal methylene radical bonded through its ethylenic bond to a carbon atom

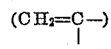

2. The process of claim 1, wherein the cationic catalyst is antimony pentachloride.
3. The process of claim 1, wherein the cationic catalyst is stannic chloride.
4. The process of claim 1, wherein the cationic catalyst is zinc chloride.
5. The process of claim 1, wherein the cationic catalyst is titanium tetrachloride.
6. The process of claim 1, wherein the cationic catalyst is stannous chloride together with iodine.
7. The process of claim 1, wherein the cationic catalyst is antimony trifluoride together with iodine.
8. The process of claim 1, wherein the cationic catalyst is antimony trichloride together with iodine.
9. The process of claim 2, wherein the alkylene oxide is propylene oxide, the α,β-unsaturated dicarboxylic acid anhydride is maleic anhydride, the mol ratio of propylene oxide to anhydride is at least 5:1, and the ethylenically unsaturated polymerizable compound is styrene.
10. The process of claim 3, wherein the alkylene oxide is propylene oxide, the α,β-unsaturated dicarboxylic acid anhydride is maleic anhydride, the mol ratio of propylene oxide to anhydride is at least 4:1, and the ethylenically unsaturated polymerizable compound together with the comonomer is present in an amount of from about 20 to about 75 weight percent, based on the weight of the total composition, the ethylenically unsaturated polymerizable compound is styrene, the comonomer is 2-ethylhexyl fumarate, and at least 60 mol percent of the styrene/2-ethylhexyl fumarate comonomers is styrene.

References Cited by the Examiner

UNITED STATES PATENTS

| | | | |
|---|---|---|---|
| 2,811,512 | 7/1953 | Austin et al. | 260—75 |
| 2,822,350 | 2/1958 | Hayes | 260—75 |
| 2,891,928 | 6/1959 | Dickey et al. | 260—75 |
| 2,918,444 | 12/1959 | Phillips | 260—78.4 |

FOREIGN PATENTS 129,688  10/1948  Australia.

MURRAY TILLMAN, *Primary Examiner.*
LEON J. BERCOVITZ, DONALD E. CZAJA,
*Examiners.*
J. A. KOLASCH, J. T. GOOLKASIAN,
*Assistant Examiners.*